May 11, 1926.

G. J. NETH

1,583,853

COMBINED CASH DRAWER AND AUTOGRAPHIC REGISTER

Filed March 13, 1922    9 Sheets-Sheet 4

Inventor

George J. Neth

By Toulmin & Toulmin

Attorneys

May 11, 1926.
G. J. NETH
1,583,853
COMBINED CASH DRAWER AND AUTOGRAPHIC REGISTER
Filed March 13, 1922    9 Sheets-Sheet 6

Inventor
George J. Neth
By Toulmin & Toulmin
Attorneys

May 11, 1926.

G. J. NETH 1,583,853

COMBINED CASH DRAWER AND AUTOGRAPHIC REGISTER

Filed March 13, 1922 9 Sheets-Sheet 7

Inventor

George J. Neth

By Toulmin & Toulmin

Attorneys

May 11, 1926.

G. J. NETH

1,583,853

COMBINED CASH DRAWER AND AUTOGRAPHIC REGISTER

Filed March 13, 1922    9 Sheets-Sheet 8

May 11, 1926. 1,583,853
G. J. NETH
COMBINED CASH DRAWER AND AUTOGRAPHIC REGISTER
Filed March 13, 1922    9 Sheets-Sheet 9

INVENTORS
George J. Neth
BY Toulmin & Toulmin
ATTORNEYS

Patented May 11, 1926.

1,583,853

UNITED STATES PATENT OFFICE.

GEORGE J. NETH, OF DAYTON, OHIO, ASSIGNOR TO THE EGRY REGISTER COMPANY, OF DAYTON, OHIO, A CORPORATION OF OHIO.

COMBINED CASH DRAWER AND AUTOGRAPHIC REGISTER.

Application filed March 13, 1922. Serial No. 543,276.

My invention relates to registers and in particular to a combined cash drawer and autographic register.

It is the object of my invention to provide means of carrying out a business system consisting of a combination of an autographic register and one or more cash drawers. It is my object to provide mechanism by which it is possible to have each transaction recorded in the handwriting of the person conducting it and to have the movement of the cash drawer at the time of the making of the transaction recorded. It is a further object to provide mechanism which will permit of the use of it by a number of clerks or employees in a store or place of business so that each clerk will have his own cash drawer while using a common autographic register and so arranging the mechanism that the transactions recorded in the handwriting of the clerk on an autographic register will be simultaneously recorded by the movement of the cash drawer and it is a further object to provide such a combination of parts which will permit of the issuing of the duplicate record to the customer in the form of a receipt in the handwriting of the clerk conducting the transaction.

It is an object of the invention to provide means whereby the drawer cannot be opened unless the autographic register is actuated and to provide means when the drawer is so actuated that its actuation must be positively recorded in addition to the record in the handwriting of the clerk on the autographic register. It is my object to provide this second recording operation in such a position that the result of it will be visible to the clerk or others who may care to inspect it. It is my object to provide such second recording mechanism in such a position that the drawer cannot be opened appreciably without actuating it and in such a position that it cannot be gotten at for modification or change by anyone desiring to tamper with it.

It is an additional object of the invention to provide with the autographic register or registers and a plurality of drawers with this supplementary recording mechanism a selector mechanism which will enable each clerk to set the mechanism prior to operation so that only the drawer belonging to that clerk will be actuated, thus confining the responsibility for each clerk to his own drawer and his own particular transactions.

It is a further object to provide in one cabinet and one mechanism a plurality of such autographic registers and such drawers with a single selector mechanism or a plurality of selector mechanisms, if desired.

It is an object of my mechanism to thus provide for the customer an autographic receipt, for the owner of the business an autographic record in the handwriting of each one of the persons making the record on behalf of the owner and a record of the actuation of each particular cash drawer which may be checked against the record that is locked in the autographic register to which only the owner will have access.

It is a further object to provide means of so unlocking the mechanism of the autographic register at the will of the owner or proprietor of the business that he may by an independent mechanism actuate any desired drawers and check the contents against the record in the register without the necessity of actuating the register and making any record thereon.

Referring to the drawings:

Fig. 8ᵃ shows in plan the portion of Fig. 8 just below it which is the portion that is used for the selection and actuation of drawer 1;

Fig. 8ᵇ is a similar view for the mechanism just below it which is found in Fig. 8 in elevation;

Fig. 8ᶜ is a similar view in plan of the mechanism for drawer 3 which is shown in elevation as a part of Fig. 8 just below it;

Fig. 8ᵈ is a plan view of the mechanism for actuating and selecting the drawer 4 and is placed just above the corresponding mechanism in elevation in Fig. 8;

Fig. 8ᵉ is a plan view of the mechanism for actuating and selecting the drawer 5 and is placed just above the corresponding mechanism in elevation in Fig. 8.

Fig. 8ᶠ shows in plan the mechanism for the actuation of drawer 6 just before the corresponding mechanism shown in elevation as a part of Fig. 8 and also shows in plan the mechanism shown just below it in Fig. 8 in elevation which is used to actuate the gong.

Referring to the drawings in detail, 1 refers generally to a cabinet in which there are the cash drawers A, B, C, D, E and F.

In the cabinet there are also storage drawers H and I and a storage cabinet G in which the money tills from the cash drawers may be placed.

Adjacent each one of the cash drawers is a cutaway portion 2 revealing a dial 3 of the individual counters actuated by the movement of the respective cash drawer attached to the respective counter.

On the top of the cabinet is placed an autographic register 4 over one series of cash drawers and an autographic register 5 over the other series of cash drawers.

Between the autographic registers is located the selector dial 6 and the selector handle 7. This dial is a semicircular member having letters or other designations identifying the drawers thereon.

The entire combination is divisible generally into several units which co-operate with one another and are interlocking, combining to produce the particular results found in this invention. There is the autographic register unit, the cash drawer unit, the selector unit, the actuator unit, the counter unit and the audible signal unit. In addition to these units there is the owner's independently operating actuating unit.

Generally, the operation of the mechanism of this invention is as follows. The clerk writes the record of the transaction on the exposed paper in the opening 8 of one of the autographic registers. This opening is the customary one found in the table 9 of an autographic register. Simultaneously the usual carbon copy is made for a permanent record maintained in the register. The clerk then actuates the handle 10 issuing the autographic receipt to the customer and storing the autographic record of the transaction in the locked autographic register. Simultaneously, by the actuation of this crank, the actuating mechanism is actuated, the proper selection having been made by the clerk through the setting of the handle 7 opposite to the designation of the particular drawer which belongs to that particular clerk, the drawer is unlocked, is forced outwardly by the spring so that the clerk may have access to the drawer and simultaneously as the drawer moves outwardly, the fact of its movement is recorded on the counter dial at 3.

After making the change, the clerk pushes the drawer shut and in doing so this restores the selector mechanism to zero, preparatory to another operation by the same clerk or another clerk.

At the end of the day's operations, the permanent record roll 11 will contain an autographic record of each one of the transactions which have taken place and the proprietor can compare the number of movements of each cash drawer with the records of the transactions made by each clerk in the clerk's handwriting.

The cash in the drawers can then be checked without actuating the autographic register by the owner unlocking the lock 12 (Fig. 6) by inserting a key in the key hole 13 and then depressing the button 14 which in turn actuates the main actuating rod 15 belonging to that particular register. The owner will have set the selector mechanism to the particular drawer which he wishes to examine and this actuation of 14 will result in the opening of the drawer when its contents may be examined.

The resilient means to be hereinafter described serves to automatically restore 15 to its normal operating position. After this examination the owner can relock 12 so that 14 cannot be actuated and the operations can proceed as described hereinbefore.

*Selector mechanism.*

Figure 1:
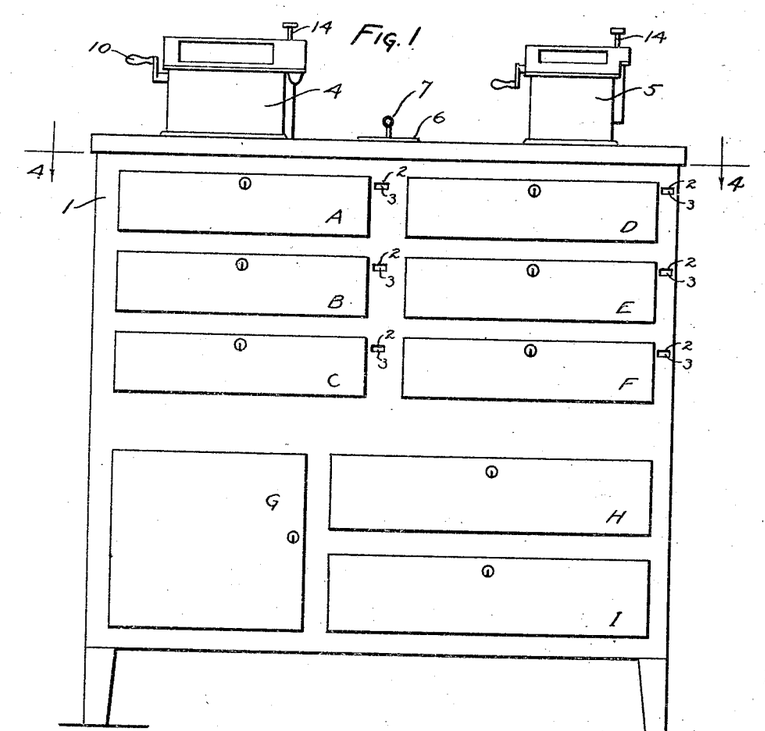
Fig. 1 is a front elevation of the complete machine.
Figure 2:
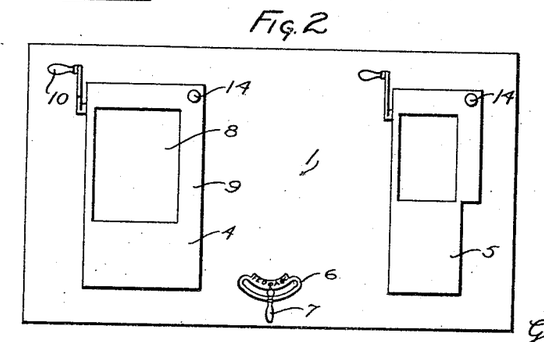
Fig. 2 is a plan view of the complete machine.
Figure 3:
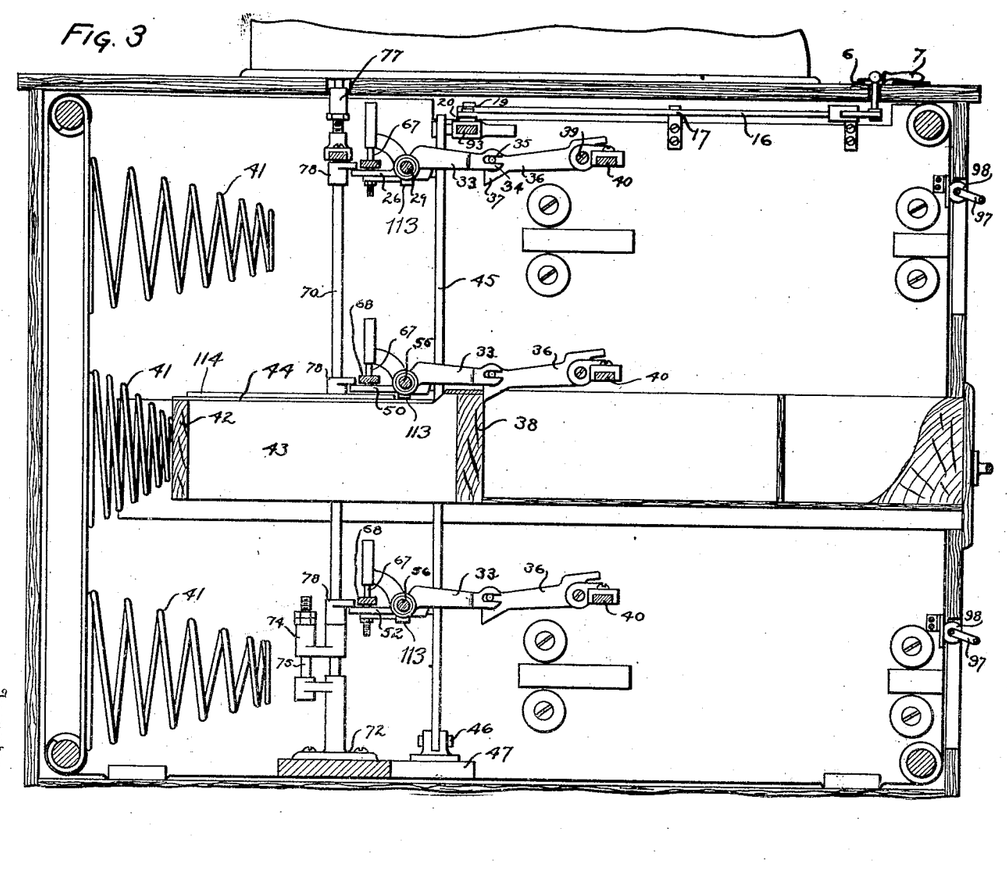
Fig. 3 is a section on the line 3—3 of Fig. 4.

The handle 7 traveling in the dial 6 moves the rod or lever 16 which is pivoted at 17 thereby actuating the link 18 pivoted to 16 at 19. This link 18 is pivoted at 20 to a slide 21. The slide 21 travels on a rod 22 rectangular in cross section by which it is guided. To this slide 21 is connected a pin or finger 23 that is located between a pair of arms 24 mounted on a sleeve 25 that extends a substantial portion of the width of the machine from the selector 26 to the selector 27. Within the rod 25 there are located a pair of rods 28 and 29 (Fig. 13) extending transversely of the machine and having their inner ends slightly spaced apart and meeting about the center of the sleeve 25. Upon each rod 28 and 29 is a lug or projection 30 and 31 respectively, the purpose of which will be hereinafter described. Connected to the rods 28 and 29 respectively and turning therewith are the latch arms 32 and 33. The end of the latch arm towards the front of the machine terminates in a pair of jaws designated at 34 (Figs. 3 and 18) in which travels a pin 35 carried on a latch 36 that has a head 37 for engagement with the inside of the rear wall 38 of any one of the cash drawers. This latch 36 is pivotally mounted at 39 upon a transverse support 40 extending from side to side of the cabinet above the cash drawers. This latch 36 serves to hold the drawer in its closed position against the expelling spring 41 which is located behind the cash drawer and engages with the back plate 42 that is supported by the side plates 43 and the top plate 44 attached to the cash drawer.

It will be understood that for each cash drawer there is an arm similar to 32 or 33, a latch similar to 36, a spring like 41 and a back plate like 42 supported in the same manner as that described.

If the drawers are arranged as shown in the drawings of this application a single pair of rods 28 and 29 will have duplicate sets of the mechanism for locking and unlocking each drawer and for expelling each drawer. For each cash drawer there is a selector such as 26 or 27 adapted to be engaged by a pin or finger such as 30 or 31. For each pair of drawers there is a pair of rods such as 28 and 29 and a casing such as 25 with a selector located at either end of the casing, and means on the casing connected with the selector handle on the top of the casing for shifting the selectors to the desired position. It will be understood that these units may be multiplied as desired.

Figures 8, 8A, 8B, 8C, 8D, 8E, 8F:
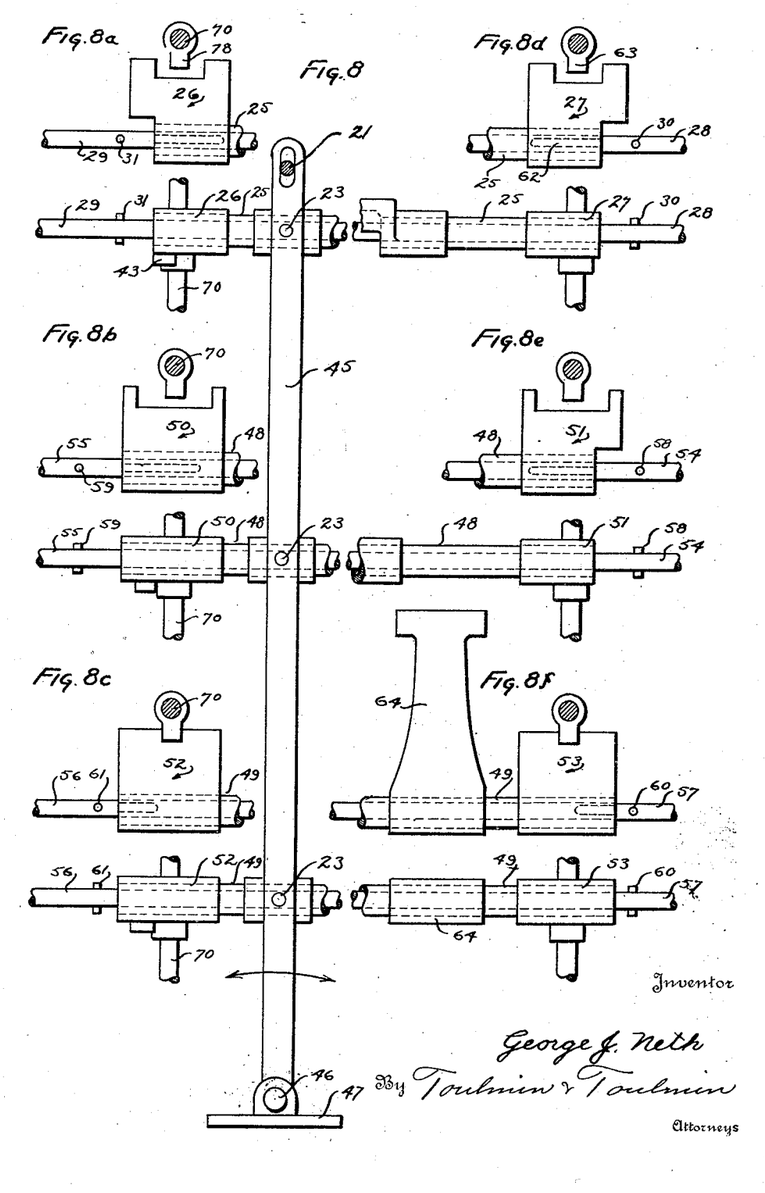
Fig. 8 is a detail view of the selector mechanism enlarged to show the particular arrangement of parts.
Figure 9:
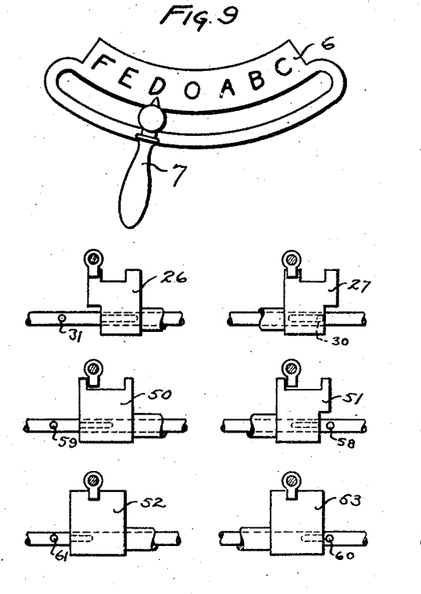
Fig. 9 is a plan view of the selector mechanism handle and dial to set at drawer 4 and a diagrammatic view of the several selecting and actuating parts in the position they would be just prior to the actuation of drawer 4.
Figure 10:
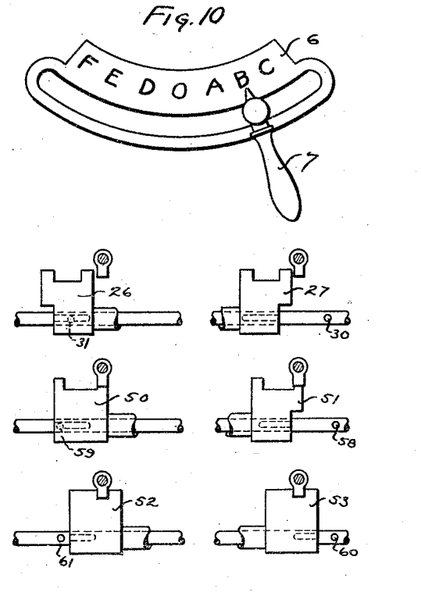
Fig. 10 is a similar view for drawer 2.
Figure 11:
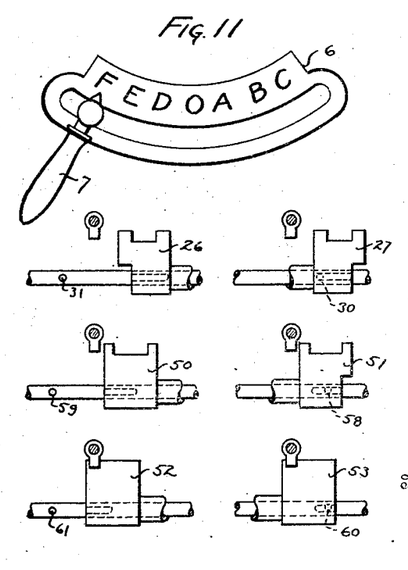
Fig. 11 is a similar view for drawer 6.

Turning to the selectors of the type of 26 and 27 which may be seen in great detail in Figures 8, 8ª, 8ᵇ, 8ᶜ, 8ᵈ, 8ᵉ and 8ᶠ, it will be observed that all of these selectors are bifurcated at their outer ends with the exception of the lowermost pair which are adapted to operate at the lowermost pair of drawers.

In Fig. 8, 45 is a vertically disposed rod connected with the selector handle through 16 and 18. It is pivoted at 46 upon the plate 47 located in the bottom of the casing. As the selector handle is moved it is shifted back and forth as indicated by the arrows at the bottom of Fig. 8. When this shifting takes place the casings 25, 48 and 49 are moved as a unit bodily laterally and with them moves the selectors 26, 27, 50, 51, 52 and 53.

The rods 28 and 29 are duplicated at 54 and 55 and 56 and 57 and have on them lugs or pins such as 30 and 31 designated 58 and 59, 60 and 61.

The parts are so arranged that in any given position for operating any given drawer the combined condition of a pin such as 30 entering a slot such as 62 together with the selector such as 27 being in the path of an actuator such as 63 will only occur for any one drawer at any one time. In all other mechanism connected with the other drawers the condition will either prevail that the pin is not in the slot of the actuator or the selector is not in the path of the actuator, or if it is in the path of the actuator, the pin is not in the slot and therefore the casing will not actuate the rod such as 28, 29, etc.

In the lowermost tier of rods the casing 49 has an arm 64 which is always actuated to ring an audible signal to be hereinafter described. This condition is taken care of, however, in such a way by the arrangement of the parts that while 64 is always actuated, yet that does not correspondingly actuate the lowermost tier of drawers.

Actuator mechanism.

Figures 13, 14, 15, 16, 17, 18:
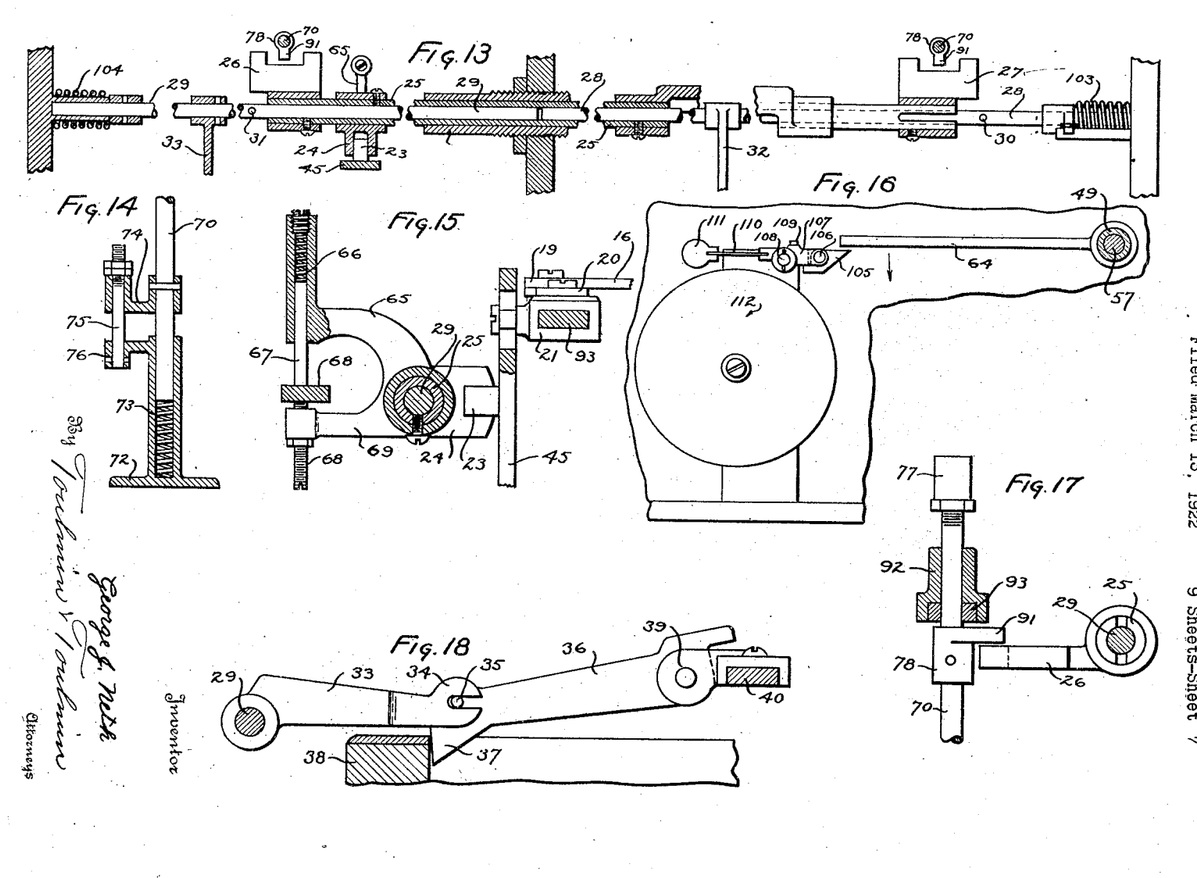
Fig. 13 is a plan view with some of the parts in section of the intermediate actuating rods carrying the selector mechanism, a portion of said mechanism being in section.
Fig. 14 is a section of the supporting base for the main actuating rod for each group of drawers.
Fig. 15 is a section on the line 15—15 of Fig. 4 and illustrates the means to return the actuating mechanism to normal position after actuation and after the unlatching operation has taken place. It also serves to maintain the latch in its latching position until actuated out of that position.
Fig. 16 is a detail elevation of the actuating mechanism for a gong and the gong so that the gong will be rung each time a drawer is actuated.
Fig. 17 is an elevation partially in section of the upper portion of one of the actuating rods for a group of drawers.
Fig. 18 is a detailed view of the retaining latch which retains the cash drawer in its closed position until the latch is lifted by the autographic register actuating mechanism.

After the actuation of the actuator by any one of the selector mechanisms, the arrangement of the yoke 65 as shown in Fig. 15 is such that due to the action of the spring 66 in one of the arms of 65, the casing 25 is returned to its normal level position as soon as it is released. The spring 66 operating against the member 67 which rests on a stationary horizontal frame member 68 resists the deflection of 65 out of its normal horizontal position and serves to return it, together with its attached parts, to this normal inoperative position. The tension on this spring is adjusted through the set screw 68 in the lower arm 69 of this bifurcated member.

Actuating mechanism.

Each tier of drawers is provided with an actuating rod 70 and 71 respectively. Each one of these rods at the bottom travels in a guiding casing 72 (see Fig. 14) and rests upon the helical spring 73 within the guiding casing. It is guided through a bracket 74, a supplementary guide rod 75 traveling in an extension 76 of 72. The actuating rod, therefore, is always being thrust upwardly so that its upper end 77 (see Fig. 3 and Fig. 6) is always kept in engagement with the register actuating rod 15 which is guided by the casing 79 and has on the top thereof a roller 80 which comes in engagement with the cam 81 carried on the shaft 82 which is driven in turn by the gears 83 and 84. These gears are connected through gears 85, 86 and 87 with the main actuating shaft 89 that is moved by a crank 90 or other similar operating mechanism. When the crank is actuated the rod 15 is depressed and consequently the rod 70. The depression of this rod carries with it the three spaced lugs 78 having the fingers 91 thereon. Each one of these fingers 91 is adapted to engage with its corresponding selector such as 26. The upper end of 70 is guided by a collar 92 supported by a transverse member 93 which in turn is supported by the frame in the cabinet.

It will be thus obvious that when the crank 90 is actuated 15 will be depressed, 70 will be depressed, 91 will move downwardly and the proper selector being in its path and having one of the pins such as 30 in a slot such as 62, the latch of the particular cash drawer desired will be unlatched and the spring will open the drawer.

Drawer counter.

Figures 5, 6, 7:
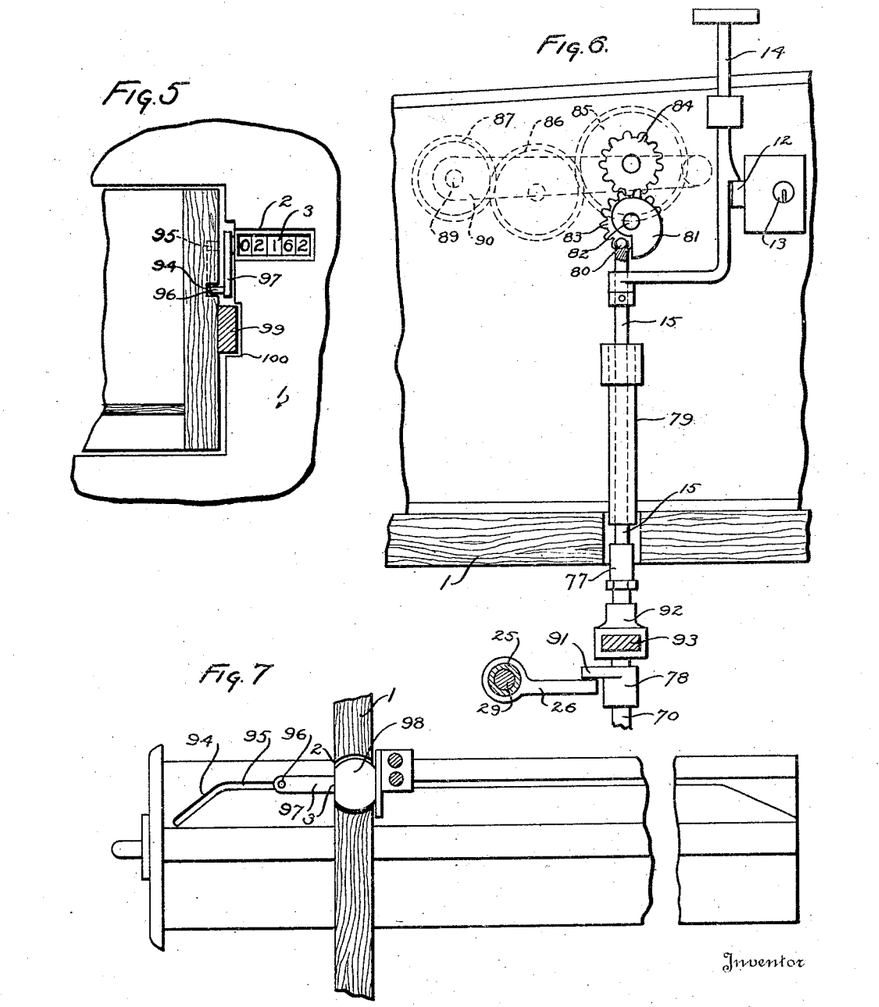
Fig. 5 is a front elevation in detail of the counter mechanism attached to the cash drawer with the drawer closed but having the front thereof removed.
Fig. 6 is a side elevation in detail of the actuating mechanism for actuating the release of any particular drawer from its retaining latch when the autographic register is being actuated for the storing of the permanent record and the issuing of the receipt to the customer. This view also shows the proprietor's locking mechanism which, when unlocked, the proprietor may operate to independently actuate the cash drawers aside from the actuation of the autographic register.
Fig. 7 is a side elevation of an individual door showing the installation and method of actuation of the counter attached to each of the cash drawers.

In order to record each opening of the drawer the side wall of the drawer is provided with a groove 94 (Figs. 5 and 7) that is placed at an angle to the line of travel of the drawer and a groove communicating therewith designated 95 that is placed on a line parallel with the line of movement of the drawer. In this groove rides a pin 96 connected to an actuating arm 97 that in turn actuates the counter 98 having the dial face 3. When the drawer is closed the pin 96 is at the bottom of 94 and as soon as the drawer is opened the pin rises in the sloping slot 94, elevates the arm 97 and actuates the counter one step forward. It will be observed that the counter is embedded in the cabinet 1 and that the drawer can scarcely be opened before the counter will be actuated thus preventing an operator from extracting anything from the cash drawer without opening the drawer sufficiently to actuate the counter and record the act. The drawer is supported in its inward and outward movement in any customary way. In Fig. 5 will be seen a side member 99 traveling in a groove 100 in the face of the cabinet 1. Suitable rollers or other mechanism may be employed.

Operator's lock plate.

Figure 12:
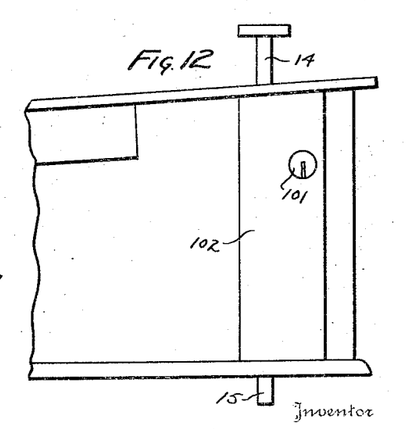
Fig. 12 is a detail view from the exterior of the autographic register of the owner's operating mechanism and the locked panel for permitting access to the register and for unlocking the owner's operating mechanism.

The operator may insert a key at 101 (Fig. 12) and remove the plate 102 for the inspection of the owner's operating mechanism or for the extraction of the permanent roll record.

Figure 4:
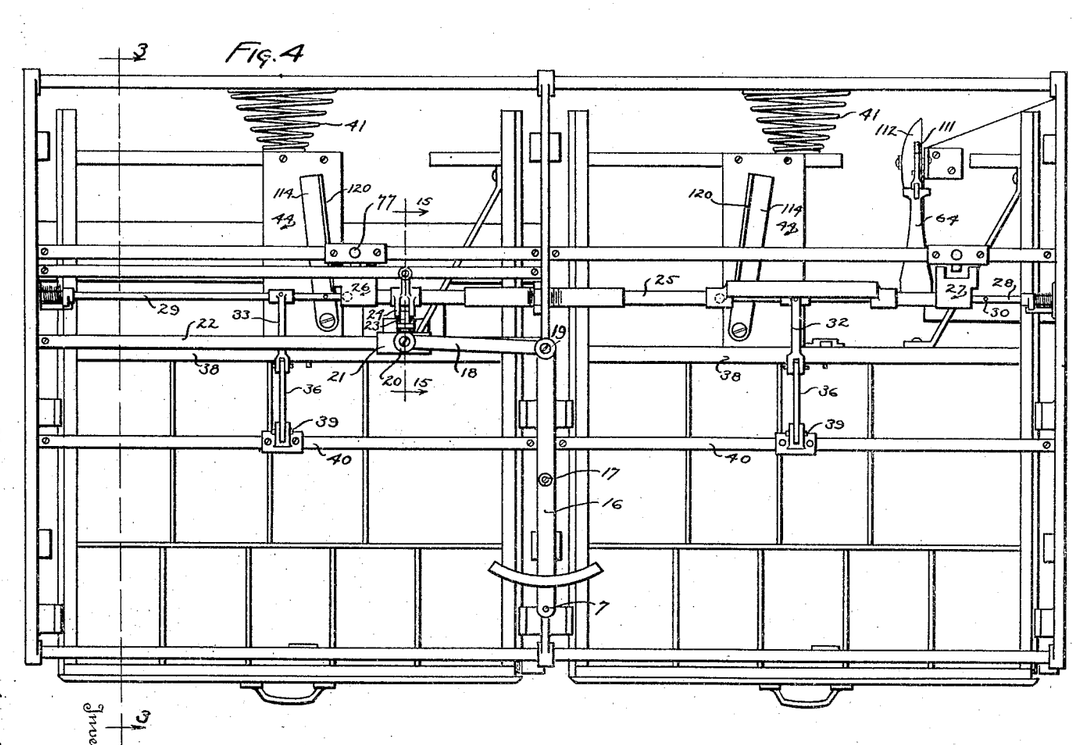
Fig. 4 is a section on the line 4—4 of Fig. 1, in which is disclosed in plan the selector mechanism.

The typical shafts 29 and 30 (Figs. 4 and 13) and similar shafts are provided at their outside ends with helical springs 103 and 104 for maintaining the shafts in their normal positions and restoring them to that position after partial rotation.

Audible signal.

Referring to Fig. 16, where this signal is illustrated in detail, the arm 64 which is always actuated when any drawer is opened, contacts with the swinging beveled head 105 pivoted at 106 to the arm 107, which in turn is pivoted at 108, and moves it downwardly. A spring or any other means resists this movement and tends to return the member 107 to its horizontal position. A stop 109 is provided to maintain it in that position. When the arm 107 and the member 105 return, 105 being pivoted at 106 and free to move upwardly, passes by over 64. A hammer arm of spring steel 110 is provided at one end of 107 with a hammer 111 which comes in contact with the gong 112 when 107 is brought to a sudden stop, having been returned to that position by the spring and stopped by the stop 109. The gong is thus rung when the drawer is opened.

Selector mechanism restored to neutral.

Referring to Figs. 19, 20, 21, 22, 23 and 24, there will be observed a lug 113 on the bottom of each of the selectors. By applying suitable movement to 113, through the rod 45 and handle 7 which actuate the selectors, the entire casing 25 or similar casing will be shifted laterally upon the rods such as 28 and 29. In order to effect this, the sleeve 25 is shifted to the required position as, for instance for the actuation of the drawer 2, at which time 113 will assume the position shown in Fig. 21. On the top of the rearwardly extending plate 44 attached to the back of each cash drawer is a swinging guide plate 114 pivoted at 115 having a spring 116 attached to a pin 117 carried by the back plate 44 and to a pin 118 carried by the swinging member 114. 114 has a pin 118 traveling in a slot 119 in the back plate 44. 114 is a right angle piece and has its vertical portion disposed at 120.

Figures 19, 20, 21, 22, 23, 24:
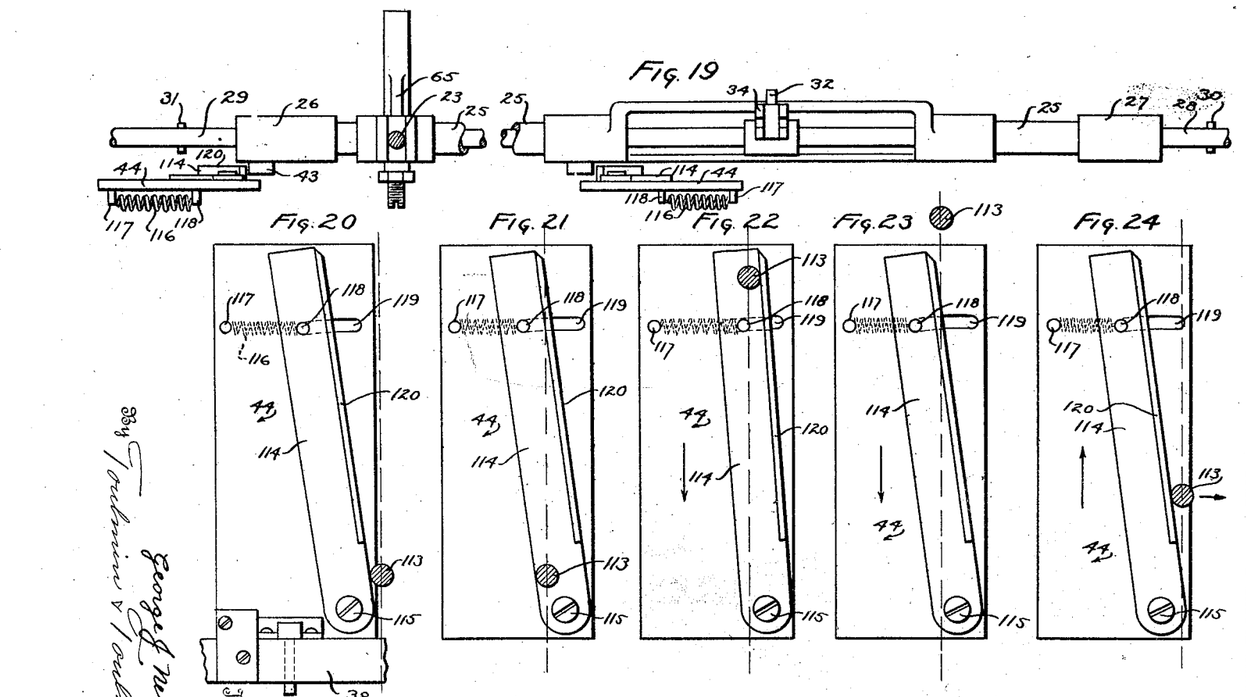
Fig. 19 is an elevation in detail of one of the rods that passes transversely of the machine behind a pair of drawers on the same level showing the mechanism to be shifted on this rod to effect the proper selection of the desired cash drawer and also showing in end elevation the parts shown in plan in Figs. 20, 21, 22, 23 and 24.
Fig. 20 represents the position of the actuating member and the means of restoring it to zero when in zero position.
Fig. 21 shows the position when the actuating member is set at No. 2, set for the actuation of the No. 2 drawer.
Fig. 22 shows the position of the parts when the drawer is opening.
Fig. 23 shows the position of the parts when the drawer is open.
Fig. 24 shows the position of the parts when the drawer is closing and returning the control to zero.

It will be thus apparent when the drawer moves inwardly, 113 having gotten on the outside of 120 as in Fig. 23, it will be forced to the right hand as the drawer is pushed in and thus the mechanism will be restored to its zero position. There is a similar mechanism on each drawer which serves to restore the mechanism to zero whenever any one of the drawers is closed.

Permanent record mechanism.

Figure 25:
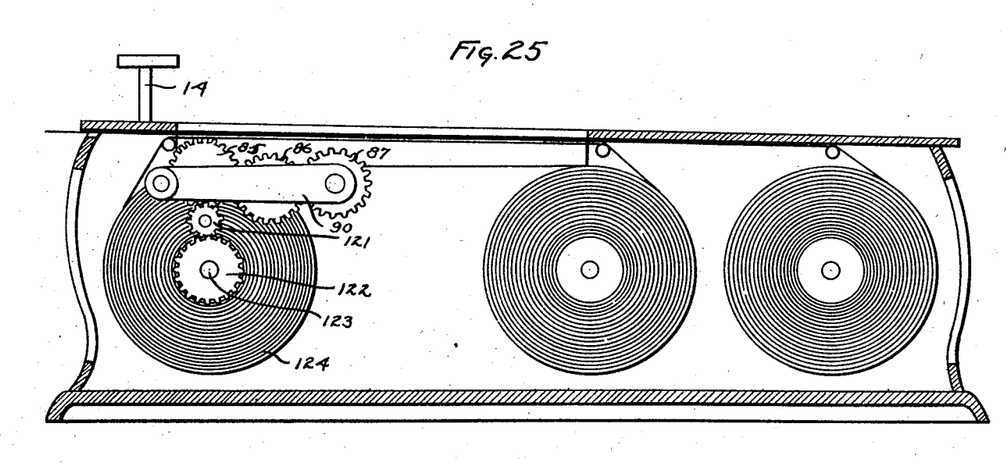
Fig. 25 shows the operating mechanism of the autographic register connected with the selector mechanism which it actuates.

The permanent record mechanism is taken care of through a chain of gears 86, 85, 121 and 122, (Fig. 25) the last mentioned gear being mounted upon the shaft 123 of the permanent record roll 124.

It will be thus seen that the permanent record will be wound on 123 simultaneously with the issuing of the receipt of the customer.

While I have shown and described certain features as constituting my invention, it will be understood that parts have been shown for purposes of illustration only, and that I do not desire to be limited to such details, as obvious modifications will occur to persons skilled in the art.

Having thus fully described my invention, what I claim as new and desire to secure by Letters Patent, is:—

1. In combination, an autographic register, a plurality of cash drawers, means for simultaneously issuing a receipt and storing a permanent record thereof, means for selecting a cash drawer for operation by the autographic register simultaneously with the delivery of the receipt and the storing of the permanent record, means for actuating counting mechanism to record the movement of said drawer, and means for closing the drawer and simultaneously moving the selecting means to normal position.

2. In combination, a cabinet, a plurality of series of drawers in said cabinet, means for maintaining said drawers locked in said cabinet, a pair of autographic registers mounted on said cabinet, means for simultaneously issuing a receipt from and storing a permanent record thereof in said registers, means in said cabinet for selecting one of said drawers to be operated and opened, means in said cabinet for actuating any one of the drawers of either series, and actuating means in each register adapted to be operated by said receipt issuing and record storing actuating means to operate the drawer actuating means of the selected drawer.

3. In combination, an autographic register, a cabinet upon which said register is mounted, a plurality of cash drawers therein, selector mechanism for selecting a given cash drawer for operation, locking mechanism for locking the cash drawers in said cabinet, actuating mechanism for unlocking said locking mechanism of any given cash drawer without unlocking the other cash drawers when said autographic register is operated, means on said autographic register for independently operating any cash drawer selected and unlocking it without operating the remainder of the cash drawers at the will of the operator, and means for restoring the selector mechanism to normal position upon the closing of the drawer.

4. In combination, a cabinet, a plurality of cash drawers therein, means for locking each of said cash drawers, means for indicating when each cash drawer is opened, said means consisting of counter mechanism, and an autographic register mounted on said cabinet, selector mechanism for selecting a given cash drawer for opening and means interconnecting said autographic register and said locking mechanism of any given cash drawer, whereby when the autographic register is operated the selected cash drawer will be unlocked, and means for restoring the selector mechanism to normal position upon the closing of the drawer.

5. In combination, a cabinet, a plurality of series of cash drawers, an autographic register mounted on said cabinet for each series of cash drawers, selector mechanism, means of actuating said selector mechanism to select any given cash drawer for operation, means for locking said cash drawers, and means connected with either of said autographic registers for unlocking any given selected cash drawer upon the operation of either of said autographic registers.

6. In combination, a cabinet, a plurality of series of cash drawers, an autographic register mounted on said cabinet for each series of cash drawers, selector mechanism, means of actuating said selector mechanism to select any given cash drawer for operation, means for locking said cash drawers, means connected with either of said autographic registers for unlocking any given selected cash drawer upon the operation of either of said autographic registers, and means to restore the selector mechanism to normal position upon the closing of the drawer which has been so unlocked and opened.

7. In combination, a cabinet, a plurality of series of cash drawers, an autographic register for each series of cash drawers, a selector mechanism, means of actuating the selector mechanism to select the particular drawer to be opened, means for locking said cash drawers, actuating means to unlock any given cash drawer so selected, said cash drawer being adapted to be operated from either of said autographic registers in either series and mechanism in each autographic register adapted to be operated at the will of the operator to unlock any given selected cash drawer without operating the autographic register.

8. In combination, a cabinet, cash drawers, means of locking said cash drawers therein, an autographic register mounted thereon, means of selecting a cash drawer to be unlocked, means adapted to be actuated by the actuating mechanism for the autographic register to effect said unlocking, means to restore said actuating mechanism to its normal position after a single actuation, and means for restoring the selector mechanism to its normal position upon the closing of the drawer.

9. In combination, a cabinet, an autographic register mounted thereon, a plurality of cash drawers therein in series, a plurality of actuating rods, there being a rod for each cash drawer, a master actuating rod for each of said series of actuating rods, means on an autographic register for actuating the master actuating rods when the autographic register is operated, and means on the actuating rods adapted to be shifted laterally thereon for selecting the particular drawer to be actuated, locking mechanism connected to each drawer and to the corresponding rod of each drawer, means for shifting the selector mechanism to select the particular drawer, a handle for actuating the selector mechanism, and a dial to indicate the position of the selector mechanism when moved, whereby when the selection has been made and the autographic register is operated the selected drawer will be opened.

10. In combination, a cabinet, an autographic register mounted thereon, a plurality of cash drawers therein in series, a plurality of actuating rods, there being a rod for each cash drawer, a master actuating rod for each of said series of actuating rods, means on an autographic register for actuating the master actuating rods when the autographic register is operated, means on the actuating rods adapted to be shifted laterally thereon for selecting the particular drawer to be actuated, locking mechanism connected to each drawer and to the corresponding rod of each drawer, means for shifting the selector mechanism to select the particular drawer, a handle for actuating the selector mechanism, a dial to indicate the position of the selector mechanism when moved, means for maintaining the master actuating rod in its inoperative position, and means for maintaining the selector mechanism in its inoperative position, whereby when the selection has been made and the autographic register is operated the selected drawer will be opened.

11. In combination, a cabinet, an autographic register mounted thereon, a plurality of cash drawers therein in series, a plurality of actuating rods, there being a rod for each cash drawer, a master actuating rod for each of said series of actuating rods, means on an autographic register for actuating the master actuating rods when the autographic register is operated, means on the actuating rods adapted to be shifted laterally thereon for selecting the particular drawer to be actuated, locking mechanism connected to each drawer and to the corresponding rod of each door, means for shifting the selector mechanism to select the particular drawer, a handle for actuating the selector mechanism, a dial to indicate the position of the selector mechanism when moved, means for maintaining the master actuating rod in its inoperative position, means for maintaining the selector mechanism in its inoperative position, and means carried by each cash drawer for restoring the selector mechanism to normal position, whereby when the selection has been made and the autographic register is operated the selected drawer will be opened.

12. In combination, a cabinet, a plurality of series of cash drawers, each series having the cash drawers superimposed one above the other, an autographic register mounted over each series and a selector handle and dial located adjacent thereto, means to lock each of said cash drawers, an actuating rod for unlocking each of said cash drawers, means mounted on said rods and slidable thereon, each of said means being slidable on a pair of rods opposite one another, a master selector mechanism operated by said selector handle for shifting said sleeves on each of said pairs of rods, actuating lugs at either end of said sleeves, cutaway portions within said sleeves at either end thereof adjacent said lugs, co-operating fingers to be inserted in said cutaway portions on each of said rods, resilient means for maintaining said rods in their normal position, a master actuating rod for each of said series of cash drawers with members thereon adapted to actuate respectively the actuating lugs on said sleeves, means for actuating said master actuating rods when either of the autographic registers is actuated, means of returning said master actuating rods to their normal inoperative position, whereby when the selector handle is moved so that the fingers on the actuating rods engage in a sleeve and the corresponding actuating lug on said sleeve is in the path of one of the actuating members on the master actuating rod, the actuation of an autographic register through the master actuating rod will unlock the selected cash drawer.

13. In combination, a cabinet, a plurality of series of cash drawers, each series having the cash drawers superimposed one above the other, an autographic register mounted over each series and a selector handle and dial located adjacent thereto, means to lock each of said cash drawers, an actuating rod for unlocking each of said cash drawers, means mounted on said rods and slidable thereon, each of said means being slidable on a pair of rods opposite one another, a master selector mechanism operated by said selector handle for shifting said sleeves on each of said pairs of rods, actuating lugs at either end of said sleeves, cutaway portions within said sleeves at either end thereof adjacent said lugs, co-operating fingers to be inserted in said cutaway portions on each of said rods, resilient means for maintaining said rods in their normal position, a master actuating rod for each of said series of cash drawers with members thereon adapted to actuate respectively the actuating lugs on said sleeves, means for actuating said master actuating rods when either of the autographic registers is actuated, means of returning said master actuating rods to their normal inoperative position, whereby when the selector handle is moved so that the fingers on the actuating rods engage in a sleeve and the corresponding actuating lug on said sleeve is in the path of one of the actuating members on the master actuating rod, the actuation of an autographic register through the master actuating rod will unlock the selected cash drawer, and means for expelling the cash drawer.

14. In combination, a cabinet, a plurality of series of cash drawers, each series having the cash drawers superimposed one above the other, an autographic register mounted over each series and a selector handle and dial located adjacent thereto, means to lock each of said cash drawers, an actuating rod for unlocking each of said cash drawers, means mounted on said rods and slidable thereon, each of said means being slidable on a pair of rods opposite one another, a master selector mechanism operated by said selector handle for shifting said sleeves on each of said pairs of rods, actuating lugs at either end of said sleeves, cutaway portions within said sleeves at either end thereof adjacent said lugs, co-operating fingers to be inserted in said cutaway portions on each of said rods, resilient means for maintaining said rods in their normal position, a master actuating rod for each of said series of cash drawers with members thereon adapted to actuate respectively the actuating lugs on said sleeves, means for actuating said master actuating rods when either of the autographic registers is actuated, means of returning said master actuating rods to their normal inoperative position, whereby, when the selector handle is moved so that the fingers on the actuating rods engage in a sleeve and the corresponding actuating lug on said sleeve is in the path of one of the actuating members on the master actuating rod, the actuation of an autographic register through the master actuating rod will unlock the selected cash drawer, means for indicating and recording for each cash drawer each time it is opened, means for expelling the cash drawer, and means for restoring the selector mechanism to normal position upon the closing of the drawer.

In testimony whereof, I affix my signature.

GEORGE J. NETH.